Aug. 25, 1953  E. N. KIRSTEN  2,649,593
CHILD'S TRAVEL UNIT
Filed Nov. 22, 1948  3 Sheets-Sheet 1

INVENTOR
Elwyn N. Kirsten
BY
ATTORNEYS

Aug. 25, 1953   E. N. KIRSTEN   2,649,593
CHILD'S TRAVEL UNIT
Filed Nov. 22, 1948   3 Sheets-Sheet 2

INVENTOR
Elwyn N. Kirsten
BY
ATTORNEYS

Aug. 25, 1953  E. N. KIRSTEN  2,649,593
CHILD'S TRAVEL UNIT
Filed Nov. 22, 1948  3 Sheets-Sheet 3

INVENTOR
Elwyn N. Kirsten,
BY
ATTORNEYS

Patented Aug. 25, 1953

2,649,593

UNITED STATES PATENT OFFICE 2,649,593

CHILD'S TRAVEL UNIT

Elwyn N. Kirsten, Philadelphia, Pa.

Application November 22, 1948, Serial No. 61,413

2 Claims. (Cl. 5—2)

1

The present invention relates to travel units for children, particularly adaptable to automobiles, but also suitable for airplanes and other vehicles.

A purpose of the invention is to protect a child who is too young to anticipate the dangers of vehicle travel without imposing unnecessary restraints on the freedom of motion of the child's body.

A further purpose is to provide an adequately safe location in which a child can sleep without danger of injury through shifting of baggage in the vehicle, or through unintended contact with the body of an adult.

A further purpose is to permit a child rider to stand safely and observe the scenery through the windows of a vehicle without suffering harm when change in direction or in acceleration of the vehicle causes a deflecting force component on the child's body.

A further purpose is to permit a child to stand in a cockpit which adequately protects the child against danger from the change in motion of the vehicle.

A further purpose is to permit converting a portion of the space of a bed into a cockpit and to permit changing a portion of the bed into a wall of the cockpit.

A further purpose is to provide a seat for a child, and to employ a portion of the space used for the bed alternatively for the seat.

A further purpose is to hinge the seat at a position above one end of the bed and to move the seat to a position out of the way and desirably vertically disposed at the end of the bed when the bed is to be occupied.

A further purpose is to hinge a bed portion and a seat, and to position these elements in the desired horizontal or vertical position by locking pins extending through locking openings.

A further purpose is to construct a child's travel unit which is of inverted L-shape, extending from the rear of the front seat to the front face of the back of the rear seat, resting in part on the rear seat and in part on the floor of the tonneau.

A further purpose is to provide storage space beneath the cockpit.

Further purposes appear in the specification and in the claims.

In the drawings I have chosen to illustrate one only of the numerous embodiments in which my invention may appear, choosing the forms shown from the standpoints of convenience in illustration, satisfactory operation and clear demonstration of the principles involved.

2

Figure 1:
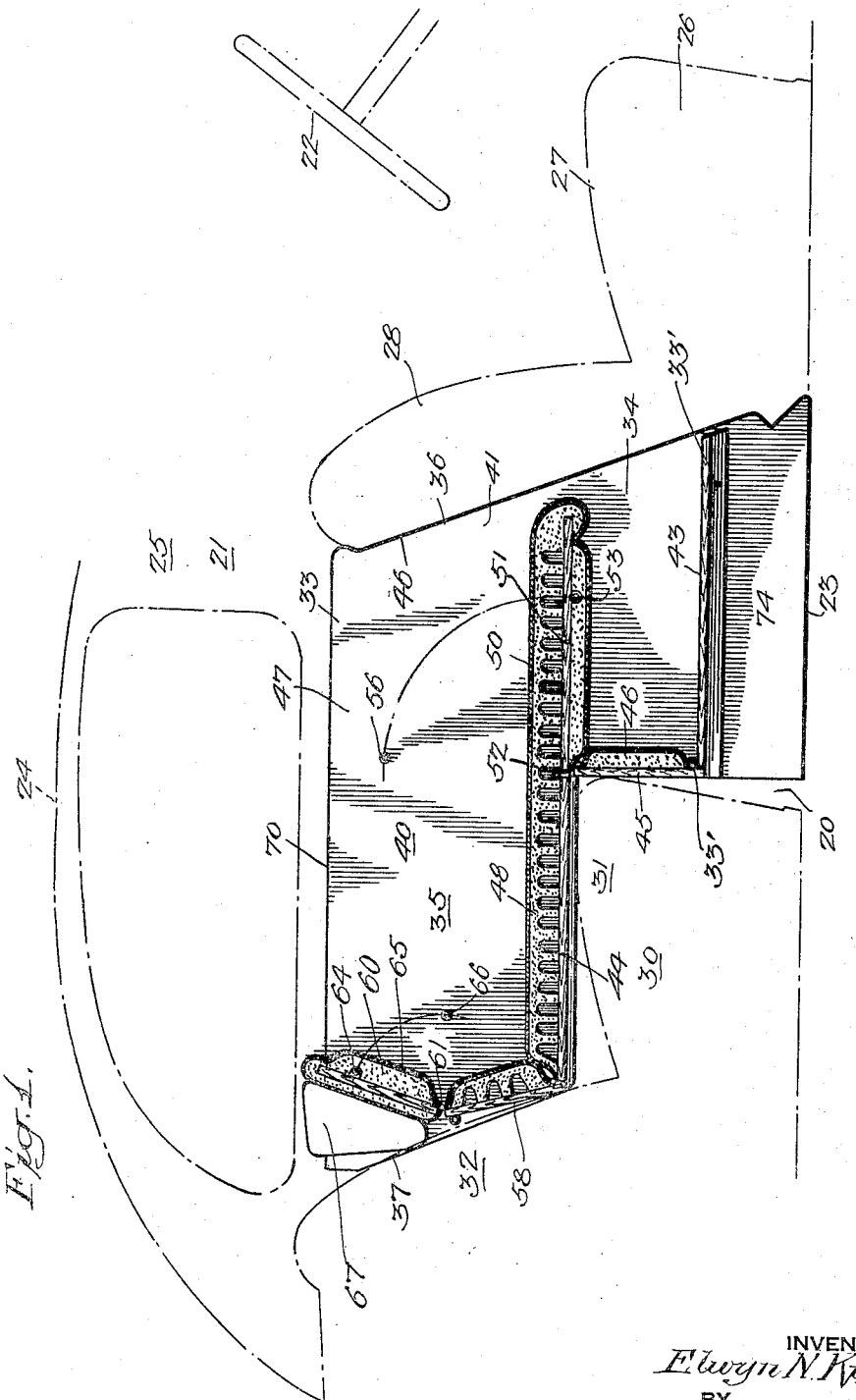
Figure 1 is a central longitudinal section of the automobile in which the invention may be applied, and of the child's travel unit in accordance with the invention placed therein, the section being taken on the line 1—1 of Figure 2, but with the bed portion in a different position from that of Figure 2.

Describing in illustration but not in limitation and referring to the drawings:

The transportation of small children by automobile, train and airplane has presented serious difficulty due to the fact that a small child is unable to anticipate the hazards to his person caused by turning of the vehicle around a corner, braking, or sudden acceleration. This is particularly so as to children in the age range between about 1 and 4 years, where the normal activity of the child makes it irksome to suffer constant restraints on motion, which might be desirable from the standpoint of safety. Thus a child in this age range quickly tires of sitting on the lap of an adult, and desires to have an opportunity to move at will at least within certain limits.

Seats, chairs and hammocks have been devised which usually support the child's body to a position above the waist, and abnormally restrain motion. Likewise, baskets and other sleeping devices are available. None of these provides for protection in all of the various positions which a child may desire to assume.

The present invention is directed to improvements in travel units for children. In accordance with the invention, the child may sleep in safety without taking undue space on the back seat or requiring holding by an adult. When, however, the child is awake, he has the alternative of sitting in a safe position where he can view the surroundings, sitting or crawling on his bed, or standing in a cockpit in which he is adequately protected against being thrown by the motion of the vehicle, and still can enjoy the view from the moving vehicle.

Referring particularly to Figure 1, the device of the invention is shown installed in the tonneau 20 of an automobile 21 having a steering wheel 22, a floor 23, a roof 24 and a side wall 25. The interior construction is provided with a front seat 26 having a bottom cushion 27 and a back 28, and with a rear seat 30 having a bottom cushion 31 and a back 32.

The child's travel unit 33 of the invention suitably is of inverted L shape, having a relatively deep cockpit 34 near the front and a relatively shallow seat and bed space 35 near the rear. The cockpit portion rests on the floor 23 of the tonneau and the seat and bed compartment rests on the rear seat cushion 31. The travel unit fits against the rear 36 of the back 28 of the front seat and against the forward edge 37 of the back 32 of the rear seat.

The travel unit is of box construction, having inverted L-shaped side walls 38 and 40 running from top to bottom and from front to rear. There is no vertical end wall at the end 41 and no vertical end wall at the opposite end 42, but the floors and tension rods later explained hold the sides firmly.

The cockpit is provided with a floor 43 desirably at a suitable height so that the child in standing on the floor can see over the top of the cockpit and out the window. The seat and bed compartment is provided similarly with a floor 44. A vertical wall 45 defines the cockpit in the space between the floor of the cockpit and the floor of the seat and bed compartment. Tension rods 33' extend from one side to another and are secured to hold the structure in position.

The entire interior of the cockpit and the seat and bed compartment is cushioned at 46, with extra cushioning provided over the top edge at 47 to avoid injury to the child.

The seat and bed compartment 35 is covered by a suitable mattress or cushion 48 extending the full length of the floor 44 and forming part of the bed. When the unit is being used for sleeping, the bed is extended by carrying a bed portion 50 in horizontal position as shown in Figure 1. The bed portion 50 is desirably cushioned by an extension of the cushion 48 so that when the cushion portions are extended out straight the bed will be very comfortable. This can be accomplished by using sponge rubber, which is highly elastic, for the entire cushion 48 and 50. The cushion 50 is suitably mounted on a swinging wall 51 hinged at 52 to the floor 44. The wall 51 has aligned locking openings 53 at a position remote from the hinge, so that a locking pin 54 can extend through aligned openings 55 in the side walls, located at the proper position to hold the hinged bed portion horizontally.

Figure 2:
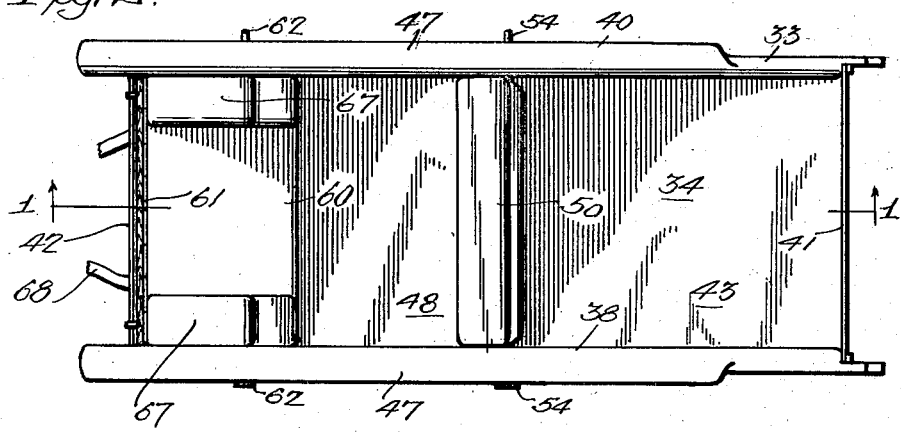
Figure 2 is a top plan view of the travel unit of Figure 1, with the cockpit in position for use.
Figure 3:
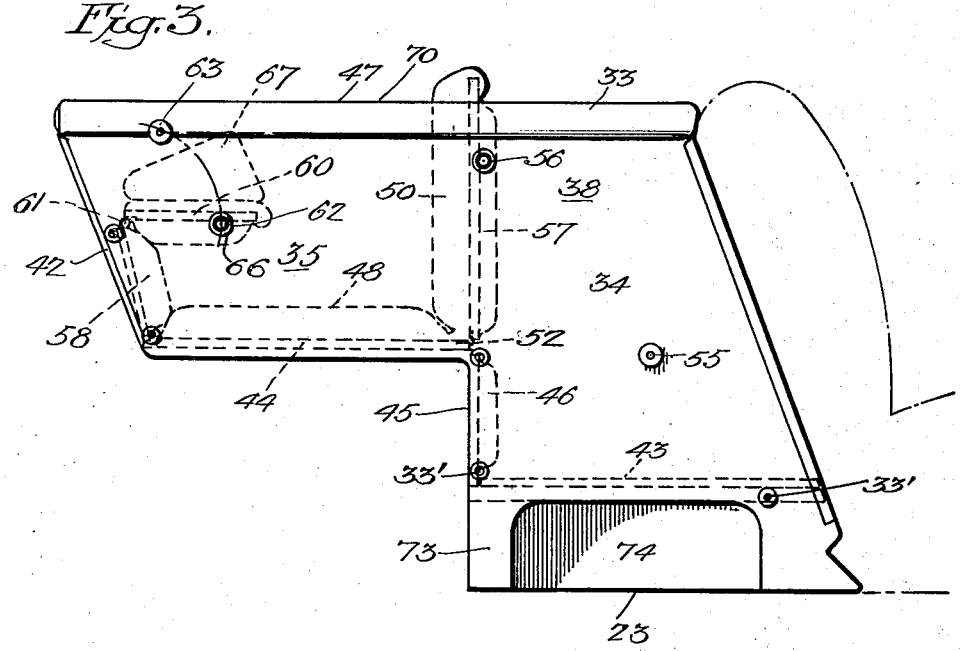
Figure 3 is a side elevation of the travel unit of the invention.
Figure 5:
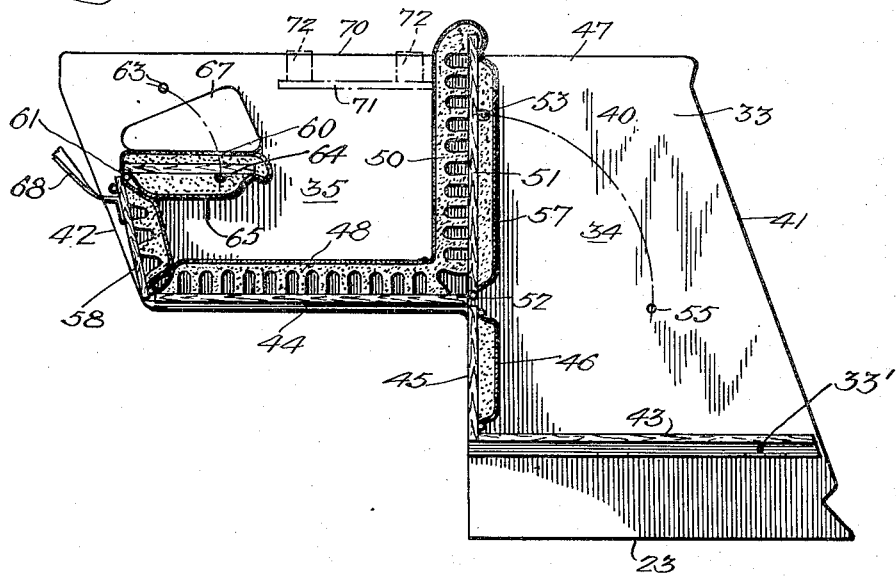
Figure 5 is a section of the unit of Figure 1, with the movable bed portion shifted to vertical position to permit occupancy of the cockpit.
Figure 4:
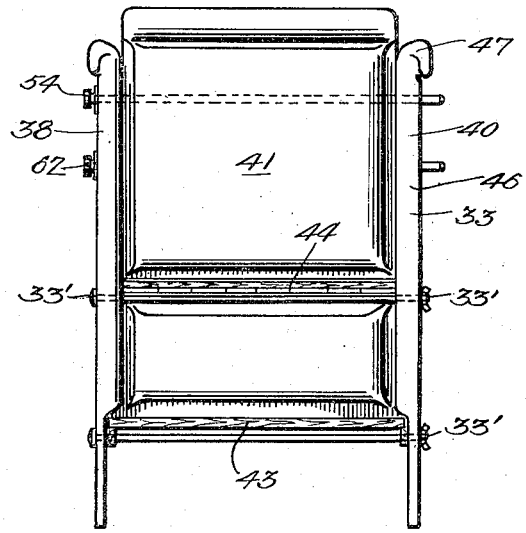
Figure 4 is a right end elevation of Figure 3, omitting the automobile.

When it is desired to dispense with the use of bed and employ the cockpit, the hinged bed portion is moved into vertical position by withdrawing the locking pin 54 from the openings 55 and inserting the same in aligned openings 56 which are set at the desired vertical position to hold the hinged bed portion 50 upright as in Figures 2, 3 and 5. Thus it will be evident that depending on whether the hinged bed portion is horizontal or vertical, the space of the cockpit may be used either for a part of the bed, or to hold the child in standing position. The portion of the hinged bed portion which extends toward the interior of the cockpit is suitably padded at 57 to protect the body of the child when the cockpit is in use.

At the portion of the bed adjoining the back of the back seat of the car, a head cushion and wall 58 are provided extending vertically across the head of the bed to protect the head of the child against injury. The upper part of the cushion and wall 58 has a seat 60 hinged thereto at 61. The seat has a generally vertical position as shown in Figure 1, in which it is held by a locking pin 62 extending through aligned openings 63 in the sides of the unit and through openings 64 extending from side to side in the seat. The portion of the seat which is directed toward the interior in the vertical position carries a cushion 65 to protect the child in case the bed is used as a play space.

To place the seat in operating position, the locking pin 62 is removed, the seat is swung to the horizontal position, and the locking pin is inserted through aligned openings 66 in the side walls and also through the openings 64 in the seat, thus holding the seat in proper seating position.

The seat is provided with arm rests 67 at opposite ends and suitably of triangular form, which move with and are preferably padded as part of the seat, and in the vertical position travel out of the way as shown in Figure 1. The seat is desirably equipped with a harness as indicated at 68 to aid in holding the child in position as well known.

The straight upper rail portion 70 of the seat compartment desirably supports a tray 71 for use in feeding the child. The tray has extensions 72 which engage the top of the sides at both ends of the tray.

Legs 73 below the cockpit rest on the floor and an opening 74 between the legs on the side toward the interior of the car permits access to a storage space beneath the cockpit floor in which the tray may be kept when not in use, along with extra clothing and supplies.

It will thus be evident that the travel unit may be employed for sleeping, playing, sitting or standing with equal versatility, and the adult caring for the child can readily convert from one function to another by simply withdrawing the locking pins of the suitable bed portion or seat to accomplish the desired position.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A child's travel unit comprising spaced parallel side walls having each a wide portion adapted to form one of the upper portions of the travel unit and having a narrow portion extending from the bottom of the wide portion, one edge of each wide portion extending substantially vertically in prolongation of one edge of a narrow portion to form a substantially vertical front edge of the travel unit, there being an angle formed by each wide and narrow portion, which angle is adapted to receive a portion of an automobile seat at the front edge thereof, a bed portion extending between the side walls at a level adjacent to and above the bottoms of the wide portions from a position adjoining the edges of the wide portions remote from the first mentioned edges to a position adjoining the apices of said angles and fixedly connected to said side walls, a second bed portion hingedly connected to the front edge of the first mentioned bed portion and movable from a position extending upwardly from said front edge of the first mentioned portion to a position in alinement with the first mentioned bed portion, means for releasably maintaining the second mentioned portion in either of said positions, and a cock-pit floor extending between and rigidly connected to the narrow portions of the side walls adjacent the lower edges thereof, one edge of the floor being in line with the apices of said angles and the space above the floor being open to form a portion of a cock-pit in which a child can stand.

2. A child's travel unit comprising interconnected spaced parallel side walls having wide portions adapted to form the upper portion of the travel unit and having narrow portions adapted to form the lower portion of the travel unit, one edge of each wide portion extending substantially vertically in prolongation of one edge of each narrow portion to form a substantially vertical front edge of the travel unit, there being an angle formed by each wide and narrow portion which angle is adapted to extend around the front edge of a seat of an automobile, cushioning means located between and connecting the bottoms of the wide portions of the side walls from the edges remote from the edges which extend in prolongation to a position adjacent the apices of said angles, a cockpit floor at a lower level than said cushioning means extending between and connecting the narrow portions of the side walls, said cushioning means having an extension swingable from a horizontal position in line with said cushioning means to a substantially vertical position in which it forms a wall above one end of the cockpit floor, and means on said extension and means on another portion of said unit for selectively holding said extension in either of the horizontal or vertical positions.

ELWYN N. KIRSTEN.

References Cited in the file of this patent

UNITED STATES PATENTS

| Number | Name | Date |
| --- | --- | --- |
| 1,208,053 | Van Allen | Dec. 12, 1916 |
| 1,233,661 | Gordon | July 17, 1917 |
| 1,238,480 | Austin | Aug. 28, 1917 |
| 1,887,810 | Hughes | Nov. 15, 1932 |
| 2,247,598 | Bohlen | July 1, 1941 |